(12) United States Patent
Yoneda et al.

(10) Patent No.: US 9,133,934 B2
(45) Date of Patent: Sep. 15, 2015

(54) SEAL CAP (75) Inventors: Masato Yoneda, Kariya (JP); Hiroyuki Nagai, Kariya (JP); Masaru Hamasaki, Kariya (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 264 days.

(21) Appl. No.: 13/823,554

(22) PCT Filed: Sep. 20, 2011

(86) PCT No.: PCT/JP2011/071393
§ 371 (c)(1),
(2), (4) Date: Mar. 14, 2013

(87) PCT Pub. No.: WO2012/039401
PCT Pub. Date: Mar. 29, 2012

(65) Prior Publication Data
US 2013/0175768 A1 Jul. 11, 2013

(30) Foreign Application Priority Data
Sep. 22, 2010 (JP) .................................. 2010-212007

(51) Int. Cl.
F04B 39/04 (2006.01)
F16J 15/02 (2006.01)
F04B 39/12 (2006.01)
F04B 39/14 (2006.01)

(52) U.S. Cl.
CPC .............. *F16J 15/02* (2013.01); *F04B 39/123* (2013.01); *F04B 39/14* (2013.01)

(58) Field of Classification Search
CPC .................................. F04B 35/06; F16J 15/02
See application file for complete search history.

(56) References Cited

U.S. PATENT DOCUMENTS 5,496,141 A * 3/1996 Popsys ........................ 411/510
5,988,223 A * 11/1999 Kanzaki et al. ................ 138/89
6,053,350 A * 4/2000 Suitou et al. .................. 220/327
(Continued)

FOREIGN PATENT DOCUMENTS

JP 9-210284 A 8/1997
JP 11-82858 A 3/1999
(Continued)

OTHER PUBLICATIONS

Translation of International Preliminary Report on Patentability for corresponding International Patent Application No. PCT/JP2011/071393 issued on Apr. 16, 2013.
(Continued)

*Primary Examiner* — Gilbert Lee
(74) *Attorney, Agent, or Firm* — Sughrue Mion, PLLC (57) ABSTRACT

A seal cap is formed of an elastically deformable material and includes a cap portion that closes a passage port, a grip portion that can be grasped, and a joining portion which integrally joins the cap portion and the grip portion. The joining portion has a bolt insertion portion through which a stud bolt can be inserted. The grip portion is formed on a side of the bolt insertion portion that corresponds to the cap portion. The joining portion is formed between the bolt insertion portion and the cap portion and is provided with a cut which communicates with the bolt insertion portion. The cut allows the cap portion to be bent and deformed by the contact between the cap portion and the stud bolt during pulling out of the seal cap from a connection portion.

7 Claims, 10 Drawing Sheets

(56) References Cited

U.S. PATENT DOCUMENTS

| | | | |
|---|---|---|---|
| 6,290,092 B1 * | 9/2001 | Cote et al. ..................... | 220/796 |
| 2003/0147756 A1 | 8/2003 | Tsukamoto | |

FOREIGN PATENT DOCUMENTS

| | | |
|---|---|---|
| JP | 2000-9287 A | 1/2000 |
| JP | 2003-227466 A | 8/2003 |
| JP | 3124207 U | 7/2006 |
| JP | 2007-83747 A | 4/2007 |
| JP | 2010-30600 A | 2/2010 |
| KR | 10-2008-0010678 A | 1/2008 |

OTHER PUBLICATIONS

Communication dated Jan. 6, 2015, issued by the State Intellectual Property Office of P.R. China in counterpart Chinese application No. 201180044858.2.

* cited by examiner

SEAL CAP

CROSS REFERENCE TO RELATED APPLICATIONS

This application is a National Stage of International Application No. PCT/JP2011/071393 filed Sep. 20, 2011, claiming priority based on Japanese Patent Application No. 2010-212007 filed Sep. 22, 2010, the contents of all of which are incorporated herein by reference in their entirety.

FIELD OF THE INVENTION

The present invention relates to a seal cap for closing a suction port and a discharge port, which are passage ports for refrigerant in a compressor.

BACKGROUND OF THE INVENTION

After a compressor for vehicle air conditioning is manufactured at a factory, lubricating oil is enclosed in the interior of the compressor. In the housing of the compressor, a suction port and a discharge port are formed at a connection portion, which is connected to external piping. After enclosing the lubricating oil, a seal cap, which is made of rubber or plastic, is press-fitted into the suction port and the discharge port so that the suction port and the discharge port are sealed by the seal cap.

Figure 10:
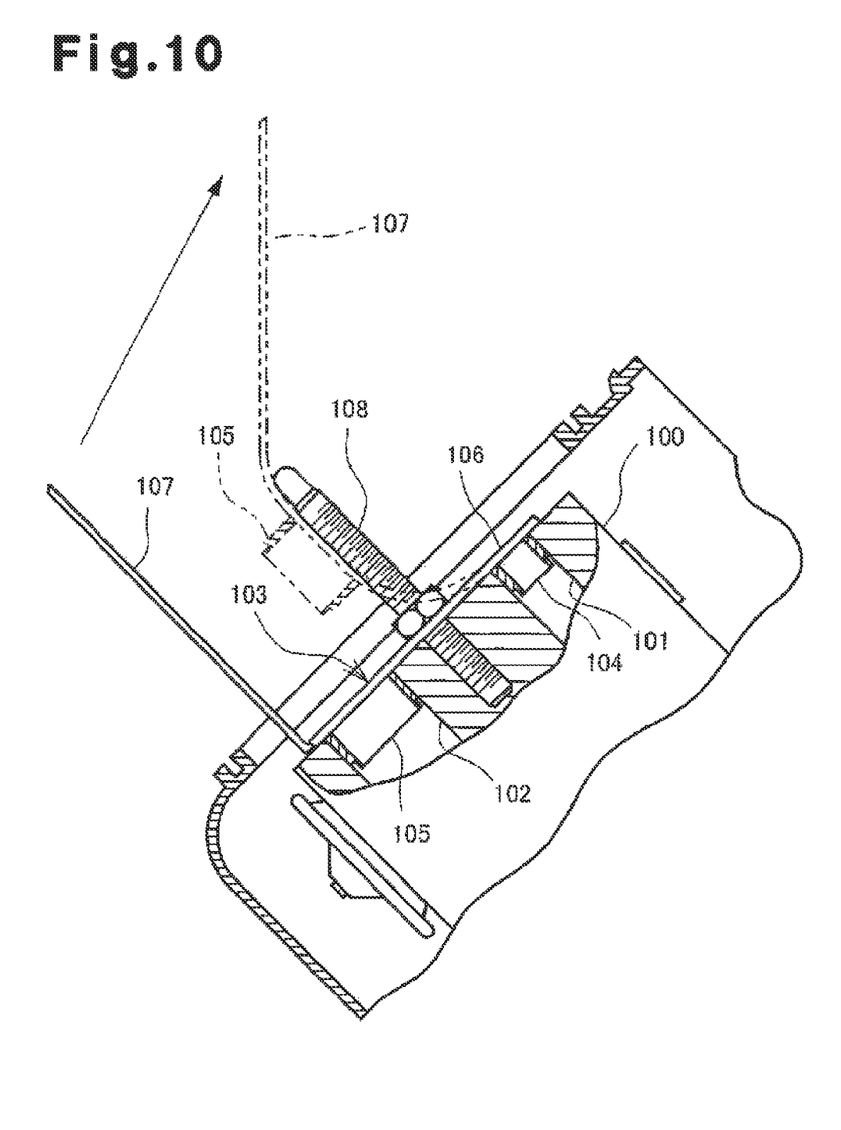
FIG. 10 is a partial side view, with a part cut away, illustrating a conventional art.

As a conventional seal cap, a dustproof cap has been known that is used in a vehicle air conditioner as disclosed in Patent Document 1. As shown in FIG. 10, the vehicle air conditioner includes a connection block 100 at an end of a set of piping through which refrigerant flows. In the connection block 100 are opened a first hole portion 101 and a second hole portion 102, which are in communication with the set of piping. A dustproof cap 103 for preventing entry of dust into an interior of an evaporator through the first hole portion 101 and the second hole portion 102 is installed on the connection block 100. The dustproof cap 103 is formed by a body 106 and a hook portion 107. The body 106 has a first fitting portion 104 and a second fitting portion 105, which seal the first hole portion 101 and the second hole portion 102, respectively. The hook portion 107 is formed to project from the body 106. The hook portion 107 is pulled when the body 106 is to be detached from the connection block 100. The hook portion 107 is formed to be rotational with respect to the body 106.

Patent Document 2 discloses another conventional sealing device. The sealing device is used in a compressor, in which a suction port and a discharge port are opened in a connection portion connected to piping and a stud bolt for fixing a piping connection member is fixed to a vicinity of each port. The sealing device seals the suction port or the discharge port. The sealing device has a seal body fitted to the suction port or the discharge port in an airtight manner, tubular bodies surrounding the periphery of the stud bolts, and a lug portion formed integral to the seal body and the tubular bodies. A slit that extends in an axial direction from a base of the tubular body is formed in a peripheral wall of the tubular body.

PRIOR ART DOCUMENTS

Patent Documents

Patent Document 1: Japanese Laid-Open Patent Publication No. 2007-83747

Patent Document 2: Japanese Registered Utility Model Publication No. 3124207

SUMMARY OF THE INVENTION

However, with the dustproof cap shown in FIG. 10, there is a problem that, depending on the direction in which the dustproof cap 103 is pulled out, the second fitting portion 105 contacts a bolt 108 after the second fitting portion 105 has been detached from the second hole portion 102, thereby making detachment of the dustproof cap 103 from the compressor difficult. In particular, as shown in FIG. 10, there are cases where the vehicle air conditioner is mounted to a vehicle in a state where the bolt 108 is inclined and the direction in which the dustproof cap 103 is pulled out is restricted due to reasons of space. In a case where the hook portion 107 is gripped and pulled out in the direction of the arrow shown in FIG. 10, the dustproof cap 103 including the second fitting portion 105, as indicated by alternate long and two short dashed lines, catches on the bolt 108 and cannot be detached from the connection block 100. Also with the sealing device disclosed in Patent Document 2, depending on the direction in which the sealing device is pulled out, the seal body detached from the suction port or the discharge port catches on the stud bolt in a manner similar to the case of Patent Document 1, making reliable detachment of the sealing device from the compressor difficult.

An objective of the present invention is to provide a seal cap that can be detached reliably from a compressor, even when a cap portion that has been detached during removal of the seal cap contacts a stud bolt provided on the compressor.

In accordance with one aspect of the present invention, a seal cap is provided that is adapted to be used in a compressor. The compressor includes a connection portion connecting a piping through which a fluid flows, a passage port opened at an end surface of the connection portion, and a stud bolt erected on the end surface of the connection portion. The seal cap is formed of an elastically deformable material and mounted to the connection portion. The seal cap includes a cap portion for closing the passage port, a grip portion, and a joining portion integrally joining the cap portion and the grip portion. The joining portion has a bolt insertion portion through which the stud bolt can be inserted. The grip portion is formed on a side of the bolt insertion portion that corresponds to the cap portion. The joining portion includes a cut that is formed on a side of the bolt insertion portion that corresponds to the cap portion and is in communication with the bolt insertion portion. The cut allows bending deformation of the cap portion by contacting of the cap portion with the stud bolt during pulling out of the seal cap from the connection portion.

With the present invention, even if, in the process of pulling out the seal cap installed on the connection portion of the compressor, the cap portion that has become detached from the passage port contacts the stud bolt, the cap portion is bent with a fulcrum portion as a fulcrum by application of a force of pulling out the seal cap and becomes displaced with respect to the joining portion. By the displacement of the cap portion with respect to the joining portion, the catching of the cap portion on the stud bolt is avoided. By further application of the force of pulling out the seal cap, the seal cap is detached from the stud bolt. Consequently, the seal cap is detached reliably from the compressor.

When a rectilinear distance between two points in the cut is defined as a distance from a position in communication with the bolt insertion portion to a position that is on side of the bolt insertion portion corresponding to the cap portion and is separated by the greatest distance from the bolt insertion portion, the rectilinear distance is preferably set to be greater than a length from the end surface of the connection portion to a distal end of the stud bolt.

In this case, rupture from the cut is prevented because the cut is formed within the joining portion of the seal cap and does not reach an outer peripheral edge of the seal cap. Also, in the process of pulling out the seal cap, the stud bolt can be passed through the cut, thereby enabling the seal cap to be detached from the compressor more reliably.

A configuration is preferably adapted in which the passage port forms a first passage port, the compressor includes a second passage port formed in the end surface of the connection portion, the stud bolt is erected between the first passage port and the second passage port, the cap portion forms a first cap portion, and a second cap portion for closing the second passage port is integrally joined to the first cap portion via the joining portion.

In this case, at the connection portion of the compressor, the first passage port and the second passage port are arranged with the stud bolt in between and the seal cap closes the first passage port and the second passage port. In the process of pulling out the seal cap, the first cap portion becomes detached first. After the catching of the first cap portion on the stud bolt is avoided, the second cap portion becomes detached from the second passage port. The first passage port and the second passage port can thus be closed by a single seal cap and the seal cap can be detached reliably from the compressor.

A configuration is preferably adapted in which the cut forms a first cut, the joining portion includes a second cut on a side of the bolt insertion portion that corresponds to the second portion, and the second cut is in communication with the first cut.

In this case, with the second cut, a position at which the force of pulling out the second cap portion acts after the catching of the first cap portion on the stud bolt has been avoided in the process of pulling out the seal cap is made close to the second cap portion. Therefore, in comparison to a case where the second cut is not present, a smaller force is required to pull out the second cap portion and the pulling out of the seal cap is made easy.

The cut is preferably formed from an outer peripheral edge of the joining portion to the bolt insertion portion.

In this case, the cut reaches the outer peripheral edge of the seal cap. Thus, in the process of pulling out the seal cap, there is no need to pass the stud bolt through the cut after the catching of the cap portion on the stud bolt has been avoided. The cut can thus be made short in comparison to the cut formed at a position within the joining portion of the seal cap.

A bolt protection portion, which covers an outer peripheral surface of the stud bolt, is preferably provided at a position of the joining portion that corresponds to the bolt insertion portion.

In this case, the stud bolt is protected because the bolt protection portion covers the outer peripheral surface of the stud bolt in the state where the seal cap is installed on the connection portion.

The bolt protection portion preferably has a cut extending from a distal end to a base portion of the bolt protection portion on a surface that corresponds to the cap portion.

In this case, detachment of the bolt protection portion from the stud bolt is made easy in comparison to a case where a cut is not present in the bolt protection portion.

Effects of the Invention

The present invention provides a seal cap that can be detached reliably from a compressor even when a cap portion that has been detached during pulling out of the seal cap contacts a stud bolt provided on the compressor.

DETAILED DESCRIPTION OF THE PREFERRED EMBODIMENTS

First Embodiment

A seal cap according to a first embodiment of the present invention will now be described based on the drawings.

Figure 1:
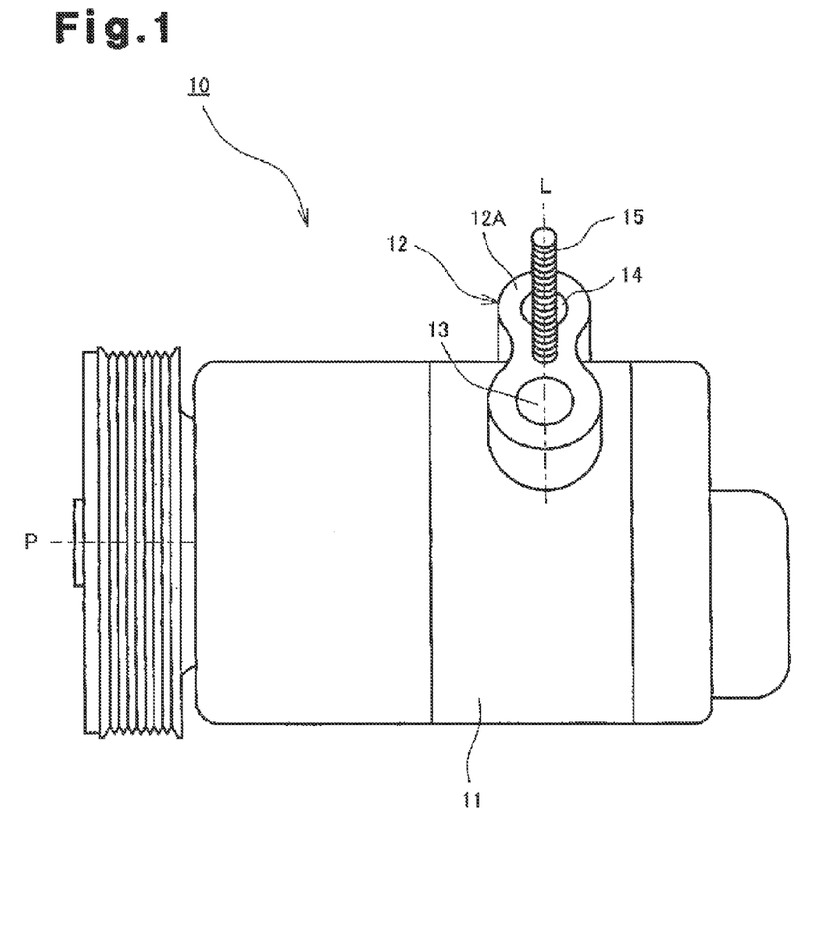
FIG. 1 is a side view of a compressor to which a seal cap according to a first embodiment of the present invention is applied.
Figure 2:
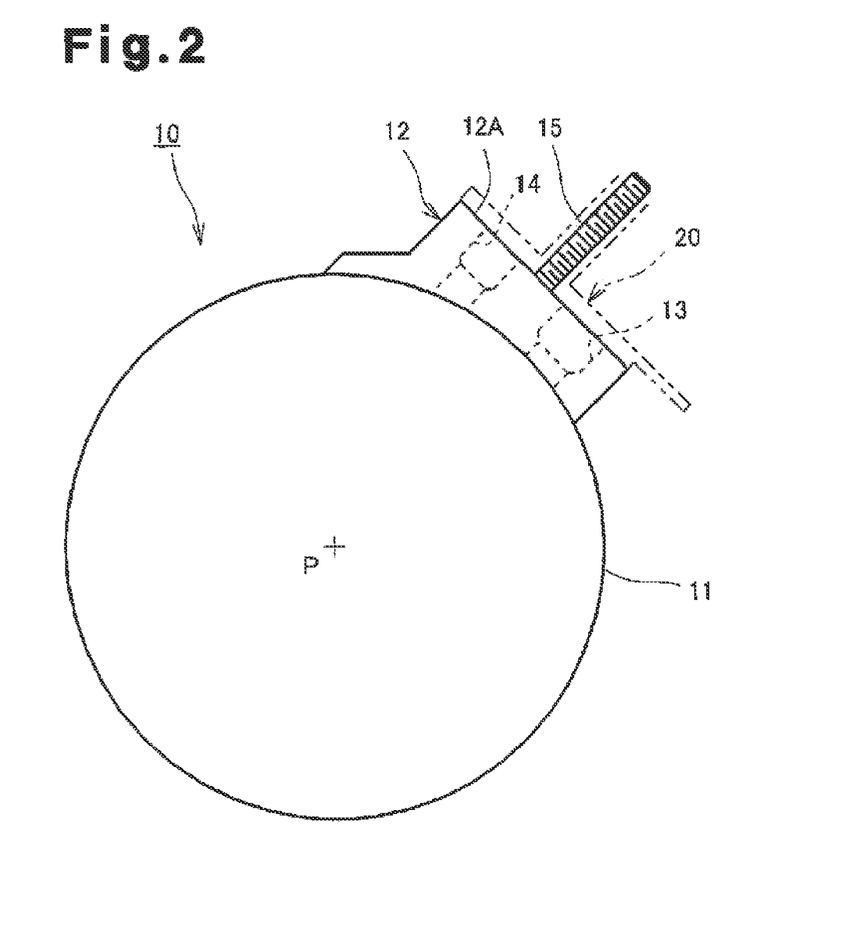
FIG. 2 is a front view of the compressor of FIG. 1.

A compressor 10 shown in FIGS. 1 and 2 is a compressor to be installed in a vehicle. A housing 11 of the compressor 10 is mainly formed by a cylinder block, a front housing member, and a rear housing member. The housing 11 is provided with a connection portion 12 for connection with piping through which refrigerant flows as fluid. An end surface 12A is formed on the connection portion 12. A suction port 13 as a passage port and a discharge port 14 as a second passage port are opened in the end surface 12A. A stud bolt 15 is erected on a portion of the end surface 12A between the suction port 13 and the discharge port 14. The stud bolt 15 is a bolt for fixing the piping connected to the connection portion 12 and is screwed into a threaded hole provided in the connection portion 12. In the present embodiment, respective centers of the suction port 13, the stud bolt 15, and the discharge port 14 are arranged to pass a hypothetical straight line L at the connection portion 12 of the compressor 10 as shown in FIG. 1. As shown in FIGS. 1 and 2, the compressor 10 is fixed inside an engine compartment of the vehicle so that the connection portion 12 of the compressor 10 is set at a position inclined by approximately 45 degrees with a rotation axis P as a center.

Figure 3:
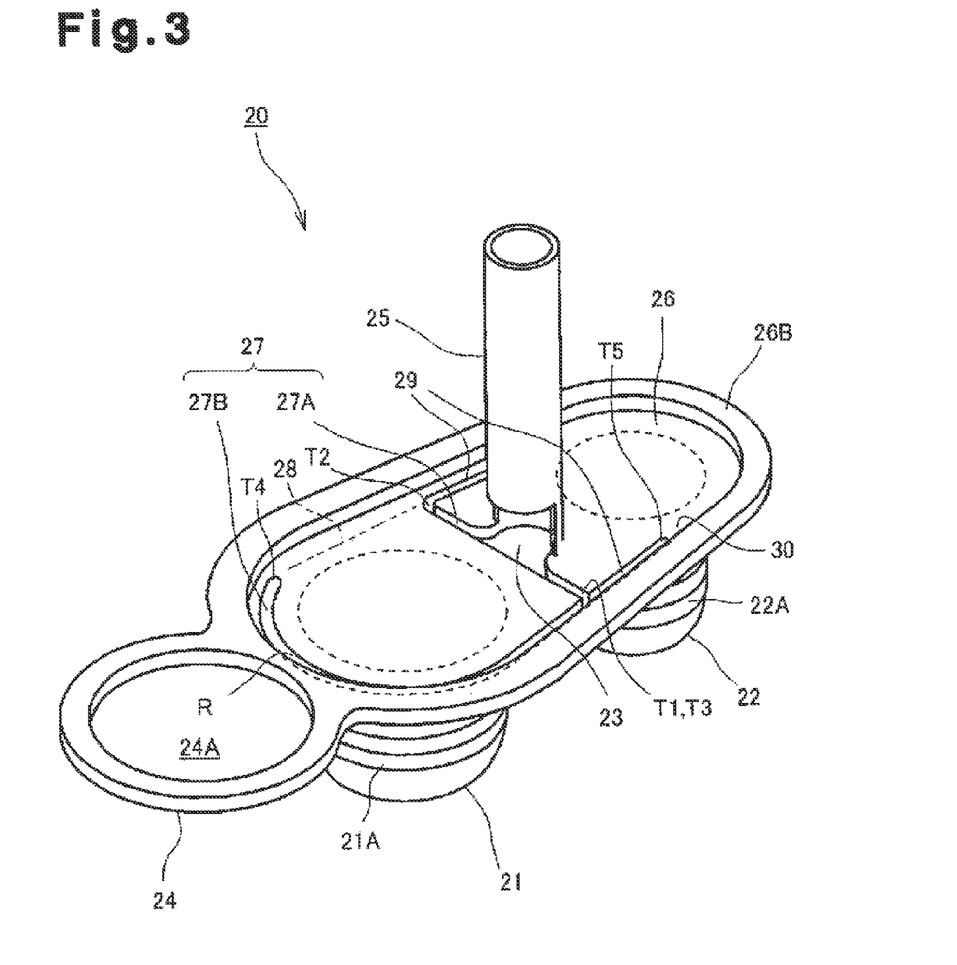
FIG. 3 is a perspective view of the seal cap according to the first embodiment of the present invention.
Figure 4A:
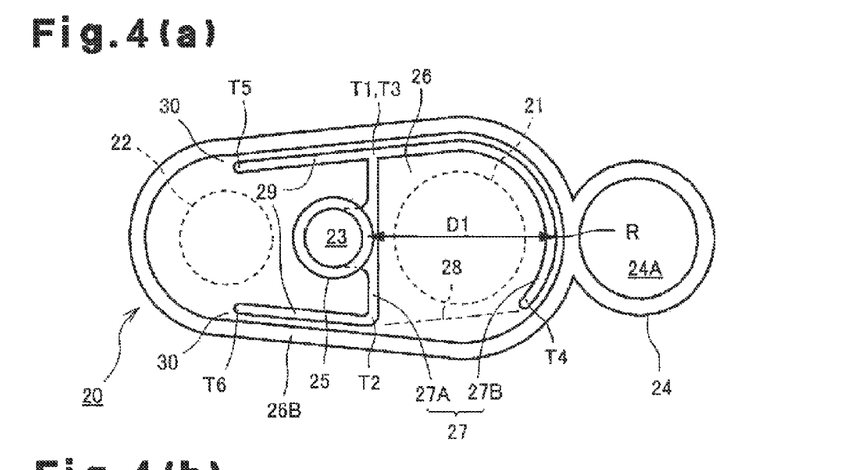
FIG. 4(a) is a plan view of the seal cap.
Figure 4B:
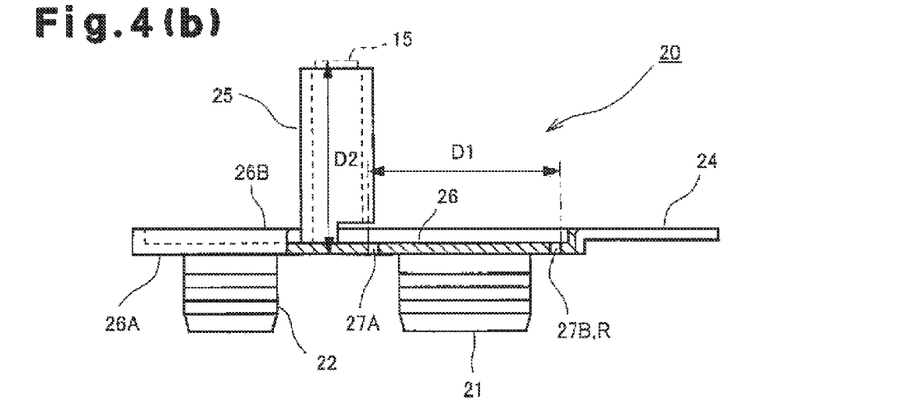
FIG. 4(b) is a side view, with a part cut away, illustrating the seal cap.

A seal cap 20 shown in FIG. 3, FIGS. 4(*a*), and 4(*b*) is installed on the connection portion 12 to close the suction port 13 and the discharge port 14. The seal cap 20 is formed, for example, of a plastic material, such as polyurethane, etc., or a rubber-based material that can be deformed elastically by pressurization by a manual force. The seal cap 20 includes a first cap portion 21 for the suction port 13, a second cap portion 22 for the discharge port 14, a grip portion 24, and a bolt protection portion 25. Further, the seal cap 20 has a joining portion 26, which integrally joins the first cap portion 21, the second cap portion 22, the grip portion 24, and the bolt protection portion 25. Also, the joining portion 26 has a bolt insertion portion 23.

The first cap portion 21 is formed to have a columnar shape, and a plurality of annular ribs 21A are formed on an outer peripheral surface of the first cap portion 21. A recess (not shown), which is formed to enter inside from a distal side of the first cap portion 21, is provided. The outer diameter dimension of the first cap portion 21 is set in accordance with an inner diameter of the suction port 13 so that it closes the suction port 13 by being press-fitted. The second cap portion 22 is formed to have a columnar shape. The second cap portion 22 includes a plurality of annular ribs 22A at an outer peripheral surface and includes, in its interior, a recess (not shown) of the same form as that of the first cap portion 21. The outer diameter dimension of the second cap portion 22 is set in accordance with an inner diameter of the discharge port 14 so that it closes the discharge port 14 by being press-fitted.

The bolt insertion portion 23 is a portion through which the stud bolt 15 can be inserted and is positioned between the first cap portion 21 and the second cap portion 22. In the present embodiment, the bolt protection portion 25 is formed to have a cylindrical shape at a position of the joining portion 26 corresponding to the bolt insertion portion 23. The cylindrical inner side portion of the bolt protection portion 25 corresponds to the bolt insertion portion 23. In a state where the seal cap 20 is installed on the connection portion 12, the stud bolt 15 is inserted through the bolt insertion portion 23 and the bolt protection portion 25 covers an outer peripheral surface of the stud bolt 15.

The grip portion 24 is for facilitating the pulling out of the seal cap 20 installed on the connection portion 12. In the present embodiment, the grip portion 24 is formed at a position at one end of the seal cap 20 that is adjacent to the first cap portion 21. That is, the grip portion 24 is formed at a position opposite the bolt insertion portion 23 with the first cap portion 21 as a center. A circular hole 24A is formed in the grip portion 24 and the grip portion 24 has a ring-like shape. The first cap portion 21 is positioned between the grip portion 24 and the bolt insertion portion 23. The grip portion 24 may be changed in position to any position as long as it is positioned on the side of the bolt insertion portion 23 that corresponds to the first cap portion 21. Also, the grip portion 24 is not particularly restricted in shape and may be changed to any shape as long as it is a shape that is capable of being gripped. When pulling out the seal cap 20 installed on the connection portion 12, the seal cap 20 is pulled out easily by latching a finger on the grip portion 24 and pulling in a pulling-out direction.

The joining portion 26 integrally joins the first cap portion 21, the second cap portion 22, and the grip portion 24. As shown in FIG. 4(*b*), the joining portion 26 includes a contacting surface 26A, which contacts the end surface 12A of the connection portion 12. Also, a thick rib 26B is formed at an outer peripheral edge of the joining portion 26. As shown in FIGS. 3 and 4(*a*), in the present embodiment, within a range that is within the joining portion 26 and surrounded by the rib 26B, a first cut 27 is formed in a region close to the first cap portion 21 from the bolt insertion portion 23, and a second cut 29 is formed on a side of the bolt insertion portion 23 that corresponds to the second cap portion 22. That is, the first cut 27 is located between the bolt insertion portion 23 and the grip portion 24.

As shown in FIGS. 3 and 4(*a*), the first cut 27 includes a transverse portion 27A, which extends along a side of the first cap portion 21 that corresponds to the bolt insertion portion 23 in a traversing manner and is in communication with the bolt insertion portion 23, and an outer peripheral portion 27B formed to extend from the transverse portion 27A toward the grip portion 24 along the rib 26B. Here, "traversing manner" does not refer to extending completely across in a direction orthogonal to a longitudinal direction of the seal cap 20, in other words, a direction orthogonal to a direction of approaching the second cap portion 22 from the grip portion 24 but refers to extending partially across in that direction. The transverse portion 27A of the first cut 27 is formed rectilinearly in the traversing direction between the first cap portion 21 and the bolt protection portion 25 and is in communication with the bolt insertion portion 23. The first cut 27 includes a plurality of ends T1 to T4. The end T3 of the outer peripheral portion 27B of the first cut 27 is in communication with the end T1 of the transverse portion 27A, and the outer peripheral portion 27B extends along the rib 26B and between the grip portion 24 and the first cap portion 21. The end T4 of the outer peripheral portion 27B is positioned at the same side of the joining portion 26 as the end T2 of the transverse portion 27A.

A point R in the outer peripheral portion 27B that is separated by the greatest distance from the center of the transverse portion 27A is present between the first cap portion 21 and the grip portion 24. Here, the center of the transverse portion 27A is the position at which first cut 27 is in communication with the bolt insertion portion 23. Also, in the first cut 27, the furthest point R is a position on a side of the bolt insertion portion 23 that corresponds to the first cap portion 21 and is separated from the bolt insertion portion 23 by the greatest distance. As shown in FIG. 4(*b*), a rectilinear distance D1 between the two points of the furthest point R of the outer peripheral portion 27B and the center of the transverse portion 27A is set to be greater than a length D2 from the end surface 12A to a distal end of the stud bolt 15. Since the rectilinear distance D1 is set to be greater than the length D2 from the end surface 12A to the distal end of the stud bolt 15, the stud bolt 15 is enabled to pass through the first cut 27 during the pulling out of the seal cap 20.

Since the first cut 27 is formed in the joining portion 26, a fulcrum portion 28 is formed at a portion of the joining portion 26 between the end T4 of the outer peripheral portion 27B and the end T2 of the transverse portion 27A. In FIGS. 3 and 4(*a*), the fulcrum portion 28 is indicated by a broken line in which a long dash alternates with a pair of short dashes for the illustrative purposes. The fulcrum portion 28 is a portion that functions as a fulcrum at which the first cap portion 21 can be displaced with respect to the joining portion 26. The fulcrum portion 28 is formed at a position of the joining portion 26 that is separated from a portion between first cap portion 21 and the bolt insertion portion 23. Since the fulcrum portion 28 is formed in the joining portion 26, even when the first cap portion 21 contacts the stud bolt 15 during the pulling out of the seal cap 20, the first cap portion 21 bends with the fulcrum portion 28 as the fulcrum, thereby avoiding catching of the first cap portion 21 on the stud bolt 15. As shown in FIG.

Figure 4C:
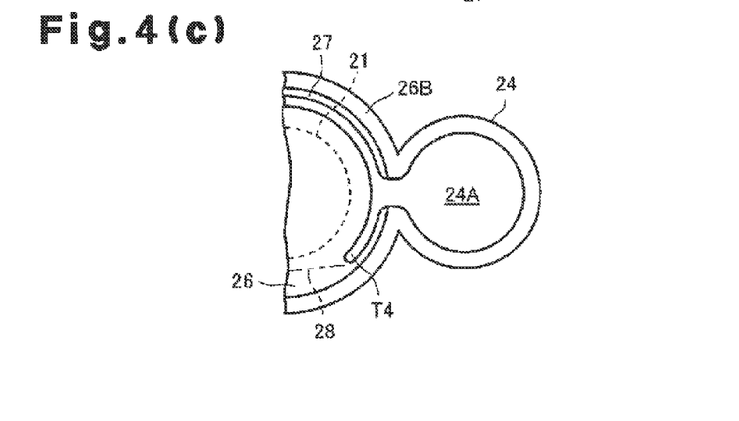
FIG. 4(c) is a partial plan view illustrating the seal cap, in which a circular hole formed by a grip portion and a cut are put in communication.

4(c), the first cut 27 may be in communication with the circular hole 24A formed by the grip portion 24. In this case, the stud bolt 15 is made to pass through the first cut 27 even more easily.

The second cut 29 will now be described.

The second cut 29 is formed by cutting rectilinearly along the rib 26B from both ends T1 and T2 of the transverse portion 27A of the first cut 27 toward the second cap portion 22. In the present embodiment, ends T5 and T6 of the second cut 29 near the second cap portion 22 are made closer to the second cap portion 22 than the bolt insertion portion 23. The ends T5 and T6 of the second cut 29 near the second cap portion 22 are made closer to the second cap portion 22 than the area between the bolt insertion portion 23 and the second cap portion 22. A second fulcrum portion 30 is thereby formed near the second cap portion 22.

Since the second fulcrum portion 30 is formed closer to the second cap portion 22 than the bolt insertion portion 23, a force pulling out the second cap portion 22 during the pulling out of the seal cap 20 is made to act more readily on the second cap portion 22. Since the position of the second fulcrum portion 30 is made closer to the second cap portion 22 than the bolt insertion portion 23, the force of pulling out the second cap portion 22 is made to act more readily on the second cap portion 22. In contrast, since the position of the second fulcrum portion 30 is made closer to the bolt insertion portion 23 than the second cap portion 22, the acting of the force of pulling out of the second cap portion 22 on the second cap portion 22 is made more difficult.

Although, in the present embodiment, the width of each of the first cut 27 and the second cut 29 is set to approximately 1 mm, the widths of the first and second cuts 27 and 29 are not restricted in particular. The first and second cuts 27 and 29 may, for example, be gap-less cuts without widths, in other words, slits. Also, each cut may be a recessed groove that is not cut completely from a top surface to a rear surface of the joining portion 26 or may be cuts that are formed in a perforated manner. In the case of a recessed grooves or perforated cuts, it suffices that the cuts become cut completely from the top surface to the rear surface of the joining portion 26 by the pulling-out force during the pulling out of the seal cap 20.

A process of pulling out the seal cap 20 of the present embodiment will now be described.

Figure 5A:
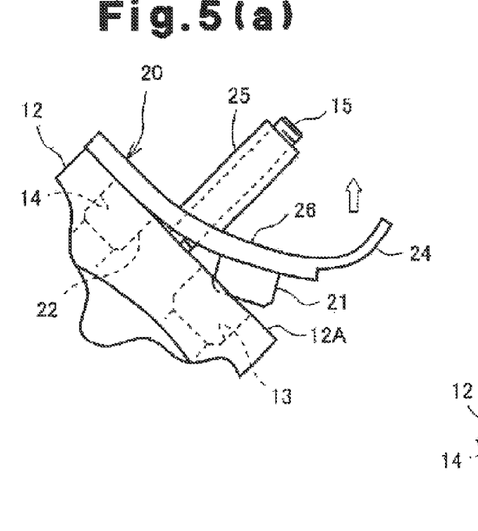
FIGS. 5(a) to 5(d) are explanatory diagrams illustrating a process of pulling out the seal cap.

The compressor 10 is mounted inside the engine compartment of the vehicle and the stud bolt 15 provided on the connection portion 12 is in a state of being inclined by approximately 45 degrees with respect to the vertical direction. The seal cap 20 is installed on the connection portion 12 of the compressor 10 with the first cap portion 21 of the seal cap 20 closing the suction port 13 and the second cap portion 22 closing the discharge port 14. A worker performing the process of pulling out the seal cap 20 first latches a finger on the grip portion 24 and moves the latched finger upward so that it approaches the stud bolt 15. The joining portion 26 thereby becomes arched and a vicinity of the grip portion 24 of the seal cap 20 begins to separate from the end surface 12A of the connection portion 12. By pulling up the grip portion 24 further in a direction of an arrow shown in FIG. 5(a), the first cap portion 21 becomes detached from the suction port 13. In each of FIGS. 5(a) to 5(d), the direction of the arrow is upward, and the pulling out of the seal cap 20 is performed in the order of FIGS. 5(a), 5(b), 5(c), and 5(d).

Figure 5B:
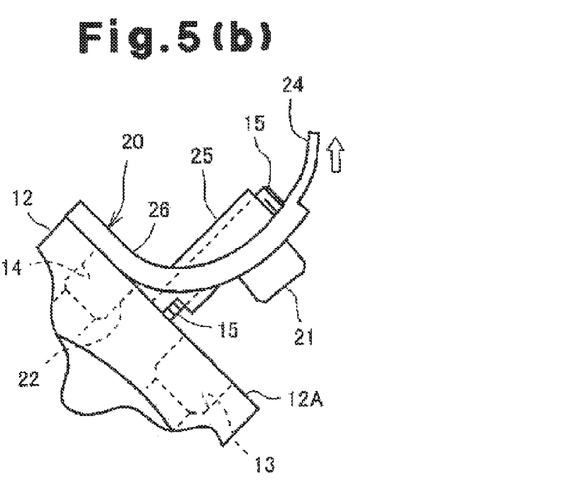
Figure 5C:
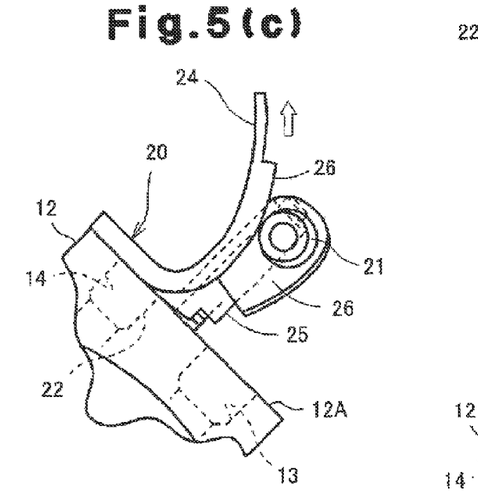

By pulling up the grip portion 24 further, the first cap portion 21 is put in contact with the stud bolt 15 as shown in FIG. 5(b). By continuing to pull up the grip portion 24, the first cap portion 21 becomes bent with the fulcrum portion 28 as the fulcrum and the seal cap 20 is separated further from the end surface 12A of the connection portion 12 as shown in FIG. 5(c). The first cap portion 21 passes by a side of the stud bolt 15 in a bent state and moves toward the second cap portion 22. In this process, the stud bolt 15 passes through the first cut 27 in the state of being covered by the bolt protection portion 25. The displaced first cap portion 21 is positioned at a side of the fulcrum portion 28 and the stud bolt 15 and the first cap portion 21 are contacted in the pulling-out direction. Catching of the first cap portion 21 on the stud bolt 15 is thereby avoided.

Figure 5D:
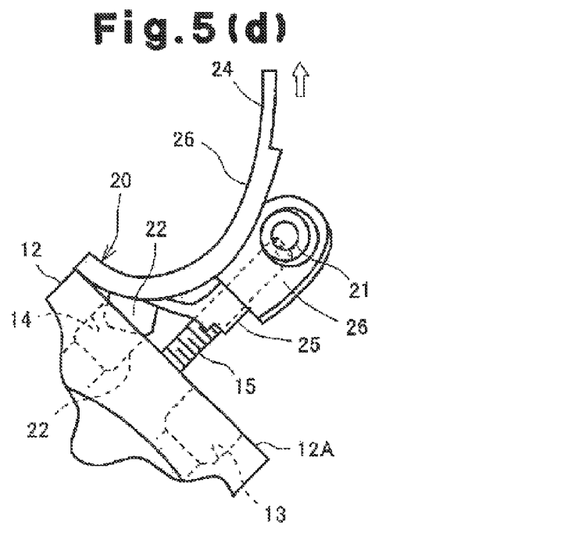

When the grip portion 24 is pulled further upward from this state, the second cap portion 22 begins to become detached from the discharge port 14 and the bolt protection portion 25 begins to be removed from the stud bolt 15 as shown in FIG. 5(d). At this point, the force of pulling out can be made to act on the second cap portion 22 readily because the second fulcrum portion 30 is set closer to the second cap portion 22 than the bolt insertion portion 23. In comparison to a case where the second fulcrum portion is further away, the second cap portion 22 can be detached with a lower force. After the second cap portion 22 has become detached from the discharge port 14 or at the same time as the detachment of second cap portion 22, the bolt protection portion 25 becomes removed from the stud bolt 15 and the pulling out of the seal cap 20 is completed.

The above described embodiment achieves the following advantages.

(1) Even if, in the process of pulling out the seal cap 20 installed on the connection portion 12 of the compressor 10, the first cap portion 21, which has become detached from the suction port 13, contacts the stud bolt 15, the first cap portion 21 is bent with the fulcrum portion 28 of the joining portion 26 as the fulcrum by the application of the force of pulling out the seal cap 20. By the bending of the first cap portion 21, catching of the first cap portion 21 on the stud bolt 15 in the pulling-out direction is avoided and the first cap portion 21 does not hinder the pulling out of the seal cap 20. When the force of pulling out the seal cap 20 is applied further, the seal cap 20 becomes detached from the stud bolt 15. Consequently, the seal cap 20 is detached from the compressor 10 reliably.

(2) The first cut 27 is formed at a position within the joining portion 26 of the seal cap 20. Thus, in the process of pulling out the seal cap 20, the stud bolt 15 can be passed through the first cut 27, thereby enabling the detachment of the seal cap 20 from the compressor 10 to be performed more reliably. Also, the first cut 27 does not reach the outer peripheral edge of the seal cap 20. Thus, after the first cap portion 21 has been pulled out in the process of pulling out the seal cap 20, the bolt insertion portion 23 and the second cap portion 22 can be detached by reference to the two points of the ends T5 and T6. That is, when pulling out the bolt insertion portion 23 and the second cap portion 22, the force of pulling out is dispersed among the ends T5 and T6. For example, if the end T2 of the first cut 27 reaches the outer peripheral edge, the force of pulling out will act on the single point of the end T5 when the bolt insertion portion 23 and the second cap portion 22 are pulled out. Thus, in comparison to the case where the first cut 27 reaches the outer peripheral edge of the seal cap 20, the present embodiment has a structure with which the seal cap 20 has a high strength against the pulling-out force.

(3) In the connection portion 12 of the compressor 10, the suction port 13 and the discharge port 14 are arranged such that the stud bolt 15 is positioned between two ports 13 and 14. The suction port 13 and the discharge port 14 are closed by the single seal cap 20, and the stud bolt 15 is inserted through the bolt insertion portion 23 of the seal cap 20. In the process of pulling out the seal cap 20, the first cap portion 21 becomes detached first. Then, after the catching of the first cap portion 21 on the stud bolt 15 has been avoided, the second cap portion 22 is detached from the discharge port 14. The suction port 13 and the discharge port 14 can thus be closed by the single seal cap 20, and the seal cap 20 can be detached reliably from the compressor 10.

(4) The seal cap 20 is provided with the second cut 29. The position at which the force of pulling out the second cap portion 22 acts after the catching of the first cap portion 21 on the stud bolt 15 has been avoided in the process of pulling out the seal cap 20 is thereby made close to the second cap portion 22. Therefore, in comparison to a case where the second cut 29 is not present, the force of pulling out the second cap portion 22 is lessened and the pulling out is made easier.

(5) In a state where the seal cap 20 is installed on the connection portion 12, the bolt protection portion 25 covers the stud bolt 15. The stud bolt 15 is thus protected in the state where the seal cap 20 is installed on the connection portion 12.

(6) The seal cap 20 has a high strength against the force of pulling out because the rib 26B is formed on the seal cap 20.

First to fourth modifications of the first embodiment will now be described.

Figure 6A:
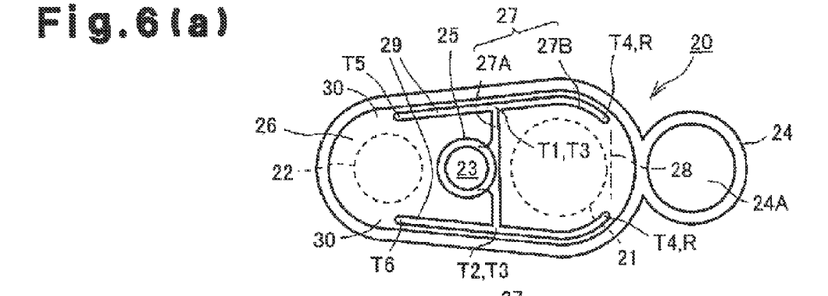
FIGS. 6(a) to 6(d) are plan views of seal caps according to first to fourth modifications of the first embodiment.

A first modification shown in FIG. 6(a) is an example of the seal cap 20 in which the position of the first cut 27 differs from that of the first embodiment. Outer peripheral portions 27B are respectively formed to extend toward the grip portion 24 from the ends T1 and T2 of the transverse portion 27A. The ends T3 at one side of the outer peripheral portions 27B are in communication with the respective ends T1 and T2 of the transverse portion 27A, and the other ends T4 of the outer peripheral portions 27B are the furthest points R. Therefore, with the seal cap 20 of the first modification, the fulcrum portion 28 in the joining portion 26 is formed between the grip portion 24 and the first cap portion 21. A rectilinear distance between each of the ends T4 of the outer peripheral portions 27B near the grip portion 24 and the transverse portion 27A is set to be greater than the length from the end surface 12A to the distal end of the stud bolt 15. With the first modification, in the process of pulling out the seal cap 20, the first cap portion 21 bends with the fulcrum portion 28 as the fulcrum at the distal side of the stud bolt 15 and the first cap portion 21 passes along the distal side of the stud bolt 15 while staying in the bent state and moves toward the second cap portion 22. By the bending of the first cap portion 21, the catching of the first cap portion 21 on the stud bolt 15 in the pulling-out direction is avoided.

Figure 6B:
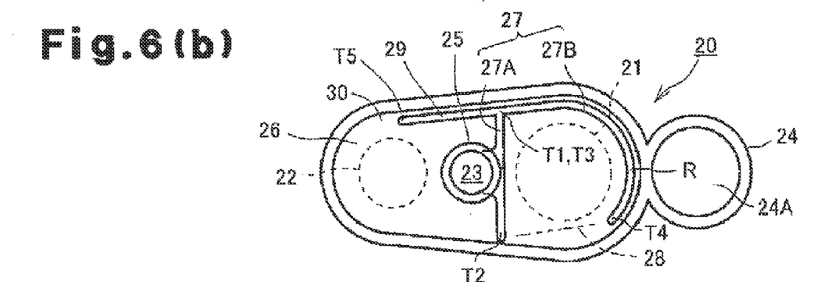

A second modification shown in FIG. 6(b) is an example of the seal cap 20 in which the second cut 29 is formed to extend only from one end T1 of the transverse portion 27A and a cut is not formed at the other end T2 of the transverse portion 27A. With the second modification, although the second cut 29 is only formed to extend from the one end T1 of the transverse portion 27A, the second fulcrum portion 30 can be formed by the end T5. The force of pulling out can thus be made to act readily on the second cap portion 22 in the process of pulling out the seal cap 20.

Figure 6C:
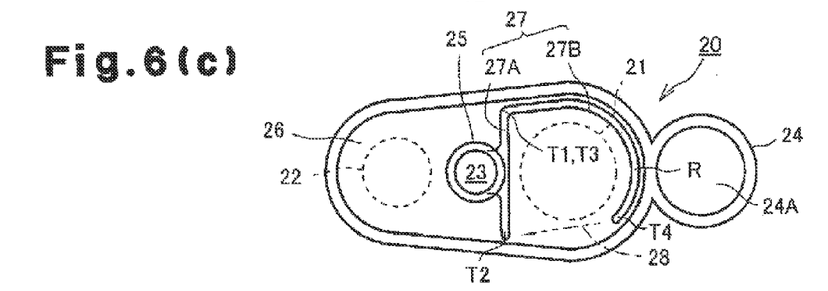

A third modification shown in FIG. 6(c) is an example of the seal cap 20 in which only the first cut 27 is formed and the second cut 29 is omitted. Although the third modification has an arrangement where the second cap portion 22 is difficult to detach in comparison to the first embodiment and the first and second modifications, the second cap portion 22 can be detached from the discharge port 14 by making the pulling-out force greater than in the case of the second modification. The catching of the suction-side cap portion 21 on the stud bolt 15 in the pulling-out direction is avoided due to the bending of the first cap portion 21 in the present case as well.

Figure 6D:
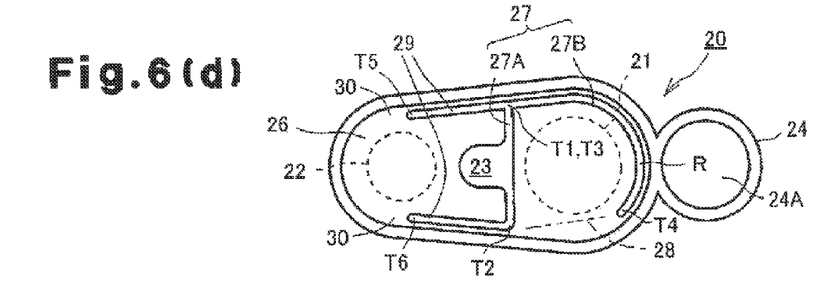

A fourth modification shown in FIG. 6(d) is an example of the seal cap 20 that does not include the bolt protection portion 25. With the fourth modification, the joining portion 26 has the bolt insertion portion 23, and the first cap portion 21 and the grip portion 24 are joined integrally by the joining portion 26. With the fourth modification, the transverse portion 27A of the first cut 27 is in communication with the bolt insertion portion 23. With the seal cap 20 of the fourth modification, even when the seal cap 20 is installed on the connection portion 12, the stud bolt 15 is exposed and not protected because the bolt protection portion 25 is not provided. In the process of pulling out the seal cap 20, there is no need to make the bolt protection portion 25 become detached from the stud bolt 15. Thus, the detachment of the seal cap 20 is made correspondingly easier.

Second Embodiment

A seal cap according to a second embodiment of the present invention will now be described.

The seal cap according to the second embodiment is an example in which a first cut reaches an outer peripheral edge of the joining portion. In regard to elements in common with the first embodiment, the description of the first embodiment will be invoked and the symbols will be used in common.

Figure 7A:
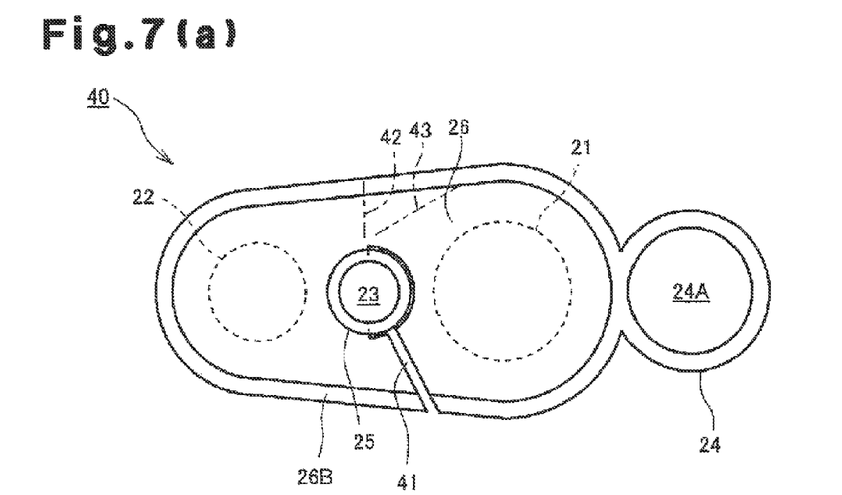
FIG. 7(a) is a plan view of a seal cap according to a second embodiment.
Figure 7B:
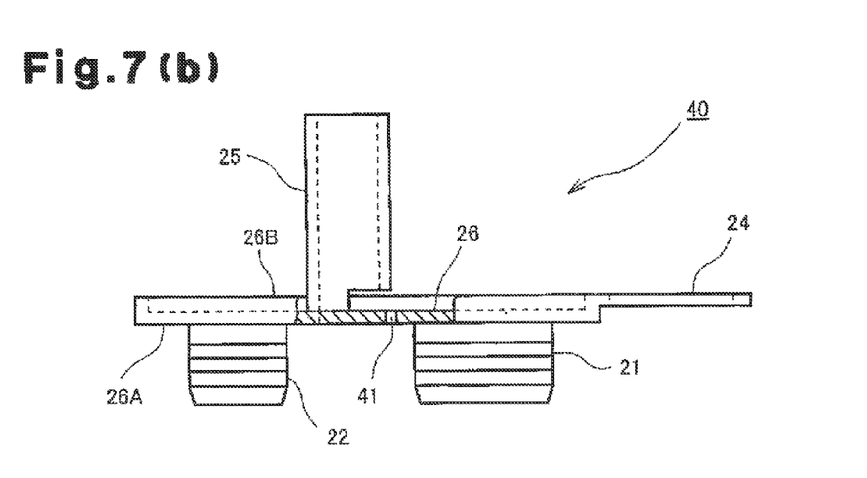
FIG. 7(b) is a side view, with a part cut away, illustrating the seal cap according to the second embodiment.

A first cut 41 is formed in the joining portion 26 of a seal cap 40 shown in FIG. 7, and the first cut 41 extends from the outer peripheral edge of the joining portion 26 to the bolt insertion portion 23. The first cut 41 is thus a cut traversing from the outer peripheral edge of the joining portion 26 to the bolt insertion portion 23. Also, the first cut 41 is positioned on a side of the bolt insertion portion 23 that corresponds to the first cap portion 21. In the joining portion 26, fulcrum portions 42 and 43 are set at a side opposite the first cut 41 across the bolt insertion portion 23. The fulcrum portion 42 is a fulcrum for displacement of the first cap portion 21 toward the bolt protection portion 25 in the process of pulling out the seal cap 40. That is, in the process of gripping the grip portion 24 and pulling out the seal cap 40 toward the stud bolt 15, the seal cap 40 bends with the fulcrum portion 42 as the fulcrum and the first cap portion 21 becomes detached. The fulcrum portion 43 is a fulcrum for making the first cap portion 21 become displaced in the state of contacting the stud bolt 15 to avoid catching on the stud bolt 15 in the process of pulling out the seal cap 40. The fulcrum portion 43 is the fulcrum necessary for making the first cap portion 21 become displaced to avoid catching on the stud bolt 15 in the process of pulling out the seal cap 40. In the seal cap 40 according to the present embodiment, the second cut is not present.

With the seal cap 40, in the process of pulling out the seal cap 40, the first cap portion 21 bends with the fulcrum portion 42 as the fulcrum and becomes displaced toward the stud bolt 15 until it contacts the stud bolt 15. Then, when the first cap portion 21 contacts the stud bolt 15, the first cap portion 21 becomes displaced with the fulcrum portion 43 as the fulcrum. By pulling out further, the first cap portion 21 bends with the fulcrum portion 43 as the fulcrum with the first cap portion 21 remaining in contact with the stud bolt 15 and passes a portion of the stud bolt 15 near the fulcrum portion 43. By continuing to pull out, detachment of the second cap portion 22 and the bolt protection portion 25 is performed.

With the present embodiment, substantially the same advantages as items (1), (3), (5), and (6) of the first embodiment are achieved. Further, with the present embodiment, the first cut 41 reaches the outer peripheral edge of the seal cap 40. Thus, in the process of pulling out the seal cap 40, there is no need to make the stud bolt 15 pass through the first cut 41 after the catching of the first cap portion 21 on the stud bolt 15 has been avoided. Therefore, in comparison to the first cut 27 formed at a position within the joining portion 26 in the seal cap 20 of the first embodiment, the length of the first cut 41 is smaller in the second embodiment. With the present embodiment, the structure of the seal cap 20 is simplified in comparison to the first embodiment. Also, the first cut 41 is provided in a region close to the first cap portion 21 from the bolt insertion portion 23. Further, the cut extends obliquely from the bolt insertion portion 23 to approach the first cap portion 21 and the joining portion 26 is thus made readily bendable with the fulcrum portion 42 as the fulcrum in the pulling out process.

First and second modifications of the second embodiment will now be described.

Figure 8A:
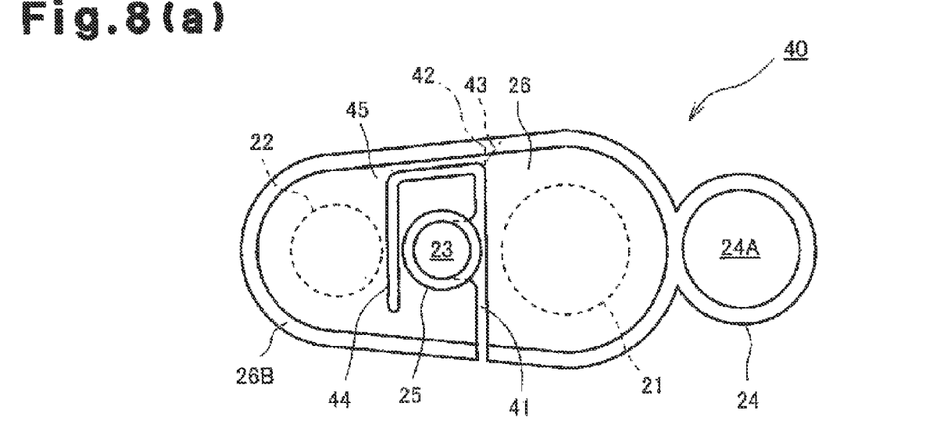
FIG. 8(a) is a plan view of a seal cap according to a first modification of the second embodiment.

A first modification shown in FIG. 8(a) is an example of the seal cap 40 in which a second cut 44 is formed in addition to the first cut 41. The first cut 41 of the first modification is formed to pass a side of the first cap portion 21 that corresponds to the bolt insertion portion 23 in a traversing manner and is in communication with the bolt insertion portion 23. With the first modification, the fulcrum portions 42 and 43 are formed at substantially the same position as one end of the first cut 41.

On the other hand, the second cut 44 is formed to extend from an end of the first cap portion 21 in the joining portion 26 toward the second cap portion 22 along the rib 26B and is further formed to pass between the bolt protection portion 25 and the second cap portion 22. With the first modification, a second fulcrum portion 45 is formed in the joining portion 26 by the forming of the second cut 44. Since the second fulcrum portion 45 is formed close to the second cap portion 22, the force of pulling out the second cap portion 22 is made to act readily on the second cap portion 22 during the pulling out of the seal cap 40. Thus, in comparison to the seal cap 40 of the second embodiment, the detachment of second cap portion 22 occurs before the detachment of the bolt protection portion 25 from the stud bolt 15 and the detachment of the second cap portion 22 is thus made easy.

Figure 8B:
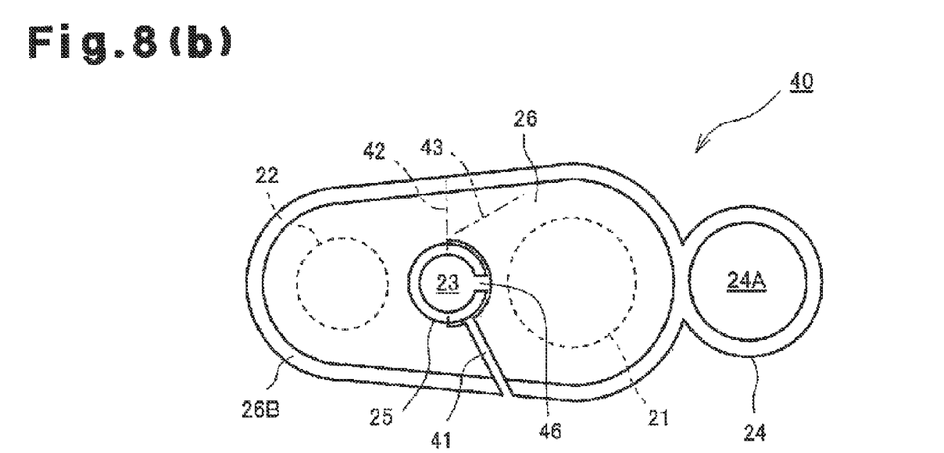
FIG. 8(b) is a plan view of a seal cap according to a second modification of the second embodiment.
Figure 8C:
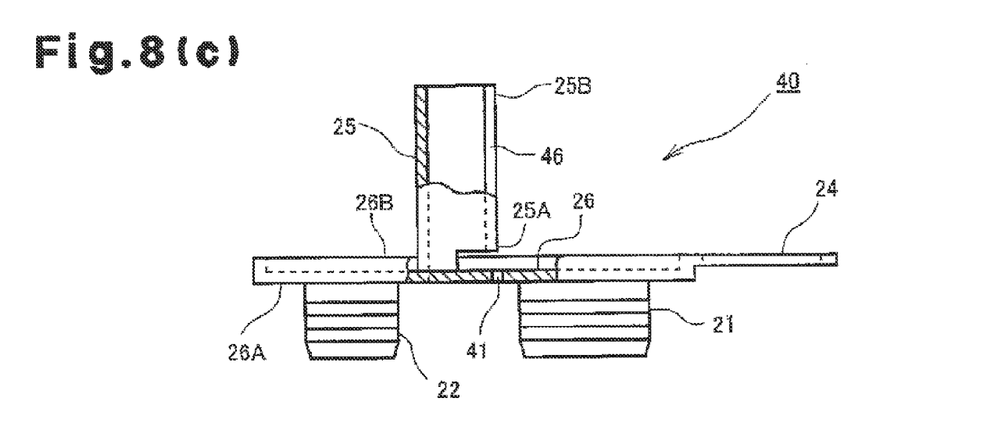
FIG. 8(c) is a partially broken-away side view of the seal cap according to the second modification of the second embodiment.

A second modification shown in FIGS. 8(b) and 8(c) is an example of the seal cap 40 in which a cut 46 is formed in the bolt protection portion 25 in the seal cap 40 according to the second embodiment. The cut 46, which extends from a base portion 25A to the distal end 25B of the bolt protection portion 25 provided in the seal cap 40, is formed on a peripheral surface of the bolt protection portion 25 that corresponds to the first cap portion 21. Since the cut 46 is formed in the bolt protection portion 25, the cut 46 of the bolt protection portion 25 is opened by pulling out further after the first cap portion 21 has become detached in the process of pulling out the seal cap 40. The bolt protection portion 25 thereby becomes detached from the stud bolt 15. Further, the second cap portion 22 becomes detached from the discharge port 14. With the second modification, the detachment of the bolt protection portion 25 from the stud bolt 15 is made easier in comparison to a case where the bolt protection portion 25 does not have the cut 46.

Third Embodiment

A seal cap according to a third embodiment of the present invention will now be described.

The third embodiment is an example of a seal cap that includes a cap portion that closes only the suction hole. A seal cap 50 shown in FIGS. 9(a) and 9(b) includes a cap portion 51, a grip portion 54, and a joining portion 56 that is integrally formed with the cap portion 51 and the grip portion 54. The joining portion 56 includes a bolt insertion portion 53 and includes a bolt protection portion 55 at a position corresponding to the bolt insertion portion 53.

The cap portion 51 closes the suction port 13 and has a columnar shape. The grip portion 54 is for facilitating the pulling out of the seal cap 50 during the pulling out of the seal cap 50. The grip portion 54 has a circular hole 54A and has substantially the same arrangement as the grip portion 24 of the first embodiment. The bolt insertion portion 53 is the portion through which the stud bolt 15 is inserted, and in the present embodiment, the bolt protection portion 55 is formed at the position of the joining portion 56 corresponding to the bolt insertion portion 53. A through hole at a position within the bolt protection portion 55 corresponds to the bolt insertion portion 53. The joining portion 56 includes an end surface 56A that contacts the end surface 12A of the connection portion 12 and a rib 56B formed along an outer peripheral edge. In the present embodiment, a cut 57, formed on a side of the bolt insertion portion 53 that corresponds to the cap portion 51, is formed in a range within and surrounded by the rib 56B of the joining portion 56.

Figure 9A:
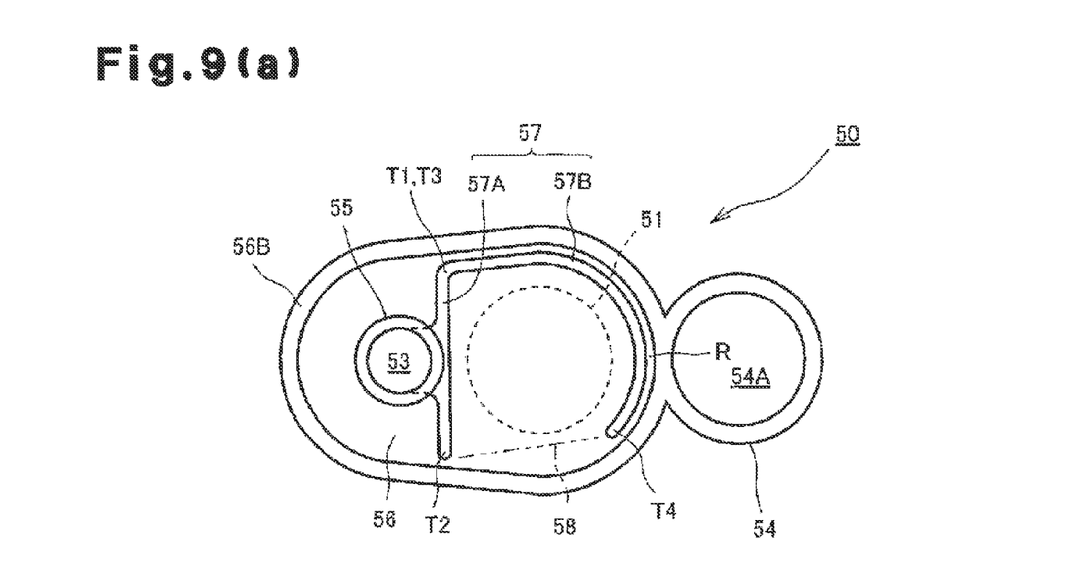
FIG. 9(a) is a plan view of a seal cap according to a third embodiment.
Figure 9B:
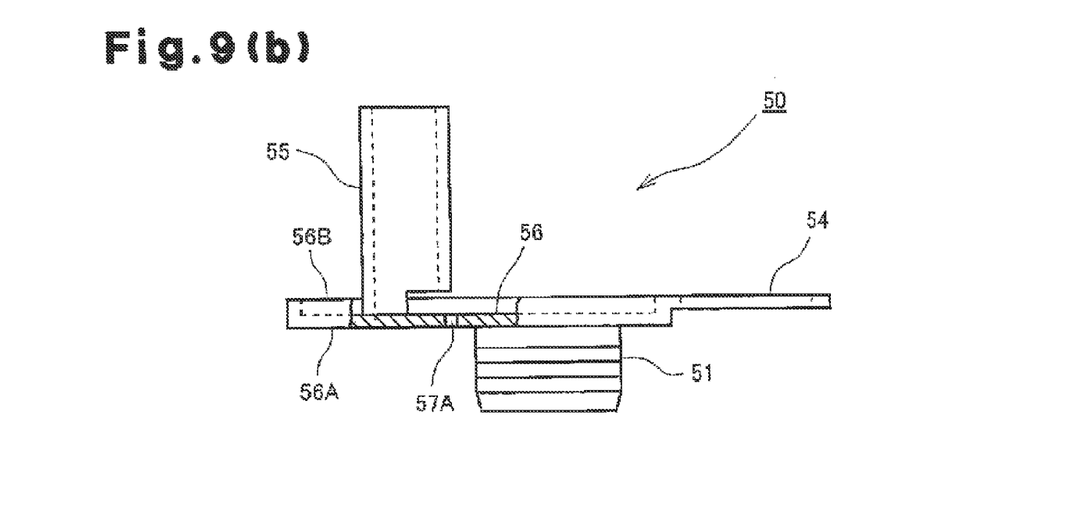
FIG. 9(b) is a partially broken-away side view of the seal cap according to the third embodiment.

As shown in FIG. 9(a), the cut 57 includes a transverse portion 57A, which is formed to pass the bolt insertion portion 53 of the cap portion 51 in a traversing manner and in communication with the bolt insertion portion 53, and an outer peripheral portion 57B, which is formed to extend from the transverse portion 57A toward the grip portion 54 along the rib 56B. The transverse portion 57A of the cut 57 is formed to extend rectilinearly between the cap portion 51 and the bolt protection portion 55 and is in communication with the bolt insertion portion 53. An end T3 of the outer peripheral portion 57B of the cut 57 is in communication with an end T1 of the transverse portion 57A. The outer peripheral portion 57B extends along the rib 56B and passes between the grip portion 54 and the cap portion 51. An end T4 of the outer peripheral portion 57B is positioned at the same side as an end T2 of the transverse portion 57A.

A point R in the outer peripheral portion 57B that is separated by the greatest distance from the center of the transverse portion 57A is present between the cap portion 51 and the grip portion 54. A rectilinear distance between the furthest point R of the outer peripheral portion 57B and the center of the transverse portion 57A is set to be greater than the length from the end surface 12A to the distal end of the stud bolt 15. Since the cut 57 is formed in the joining portion 56, a fulcrum portion 58 is formed at a portion of the joining portion 56 between the end T4 of the outer peripheral portion 57B and the end T2 of the transverse portion 57A.

With the present embodiment, even if, in the process of pulling out the seal cap 50 installed on the connection portion 12 of the compressor 10, the cap portion 51, which has become detached from the suction port 13, contacts the stud bolt 15, the cap portion 51 is bent with the fulcrum portion 58 of the joining portion 56 as the fulcrum and becomes displaced with respect to the joining portion 56. By the displacement of the cap portion 51 with respect to the joining portion 56, catching of the cap portion 51 on the stud bolt 15 is avoided and the cap portion 51 does not hinder the pulling out of the seal cap 50. The cut 57 may be put in communication with the circular hole 54A of the grip portion 54. In this case, the stud bolt 15 passes through the cut 57 even more easily. A seal cap having the same arrangement as the seal cap 50 and adapted for the discharge port 14 may also be used for the discharge port 14.

Each of the seal caps according to the embodiments described above demonstrates an embodiment of the present invention, and the present invention is not restricted to the embodiments described above. Various changes may be made within the scope of the gist of the invention as described below.

Although with each of the embodiments described above, the vehicle-installed compressor is described as an example of a compressor on which the seal cap is installed, the type of compressor is not restricted in particular. For example, the compressor may be of a swash plate type, scroll type, or vane type and is also not restricted to a vehicle-installed compressor.

Although with each of the embodiments described above, an example is described where the seal cap is installed on the connection portion formed on the housing of the compressor, the connection portion is not restricted to being formed on the housing. For example, the connection portion may be formed on another member provided on the housing.

Although in each of the embodiments described above, the respective centers of the suction port, the stud bolt, and the discharge port are arranged to pass through the hypothetical straight line in the connection portion of the compressor, the respective centers the suction port, the stud bolt, and the discharge port may instead be shifted in position with respect to each other. In this case, in the seal cap, the first cap portion, the bolt insertion portion, and the second cap portion are changed to shapes that are shifted in position with respect each other in accordance with the positions of the suction port, the stud bolt, and the discharge port.

Although with each of the embodiments described above, the compressor is fixed inside the engine compartment so that the suction port is set at a lower position than the discharge port, the compressor may be one that is fixed such that the discharge port is set at a lower position than the suction port. With the seal cap in this case, for example, the position of the second cap portion for the discharge port and the position of the first cap portion for the suction port are interchanged and the grip portion is provided near the cap portion for the discharge port.

Although with each of the embodiments described above, the grip portion is formed to have a ring-like shape, the grip portion suffices to be of a shape that can be gripped readily by the worker in the process of pulling out the seal caption and the shape is not restricted in particular. Also, the grip portion suffices to be provided to be present on a side of the bolt insertion portion that corresponds to the cap portion.

Although with each of the embodiments described above, the rib is provided to extend along the outer peripheral edge of the seal cap, the providing of the rib is not essential. For example, the rib may be omitted.

With each of the embodiments described above, an example is described where the compressor is mounted to the engine compartment in the state where the stud bolt provided on the connection portion is inclined by approximately 45 degrees with respect to the vertical direction. However, the direction of the stud bolt is not restricted in particular and may be changed as suited. For example, the stud bolt may be arranged in the vertical direction or may be arranged to be inclined at an angle other than 45 degrees.

In each of the embodiments described above, the rectilinear distance between two points in the cut from the position in communication with the bolt insertion portion to the position R, which is separated by the greatest distance from the insertion portion is set to be greater than the length from the end surface to the distal end of the stud bolt. However, depending on the material of the seal cap, the distance may be changed.

In a case where the material of the seal cap has a sufficient elongation allowance, for example, in a case of a rubber-based material, the rectilinear distance between the two points may be set to be smaller than the length from the end surface to the distal end of the stud bolt.

The invention claimed is:

1. A seal cap configured to be used in a compressor that includes a connection portion connecting a piping through which a fluid flows, a passage port opened at an end surface of the connection portion, and a stud bolt erected on the end surface of the connection portion, wherein the seal cap is formed of an elastically deformable material and mounted to the connection portion, the seal cap comprising:
   a cap portion configured to close the passage port;
   a grip portion; and
   a joining portion integrally joining the cap portion and the grip portion; and
   wherein the joining portion has a bolt insertion portion configured to allow the stud bolt to be inserted therethrough,
   the grip portion is formed on a side of the bolt insertion portion that corresponds to the cap portion,
   the joining portion includes a cut that is formed on a side of the bolt insertion portion that corresponds to the cap portion and is in communication with the bolt insertion portion, and
   the cut is configured to allow bending deformation of the cap portion by contacting of the cap portion with the stud bolt during pulling out of the seal cap from the connection portion.

2. The seal cap according to claim 1, wherein, when a rectilinear distance between two points in the cut is defined as a distance from a position in communication with the bolt insertion portion to a position that is on side of the bolt insertion portion corresponding to the cap portion and is separated by the greatest distance from the bolt insertion portion, the rectilinear distance is set to be greater than a length from the end surface of the connection portion to a distal end of the stud bolt.

3. The seal cap according to claim 1, wherein
   the passage port forms a first passage port,
   the compressor includes a second passage port formed in the end surface of the connection portion,
   the stud bolt is erected between the first passage port and the second passage port,
   the cap portion forms a first cap portion, and
   a second cap portion for closing the second passage port is integrally joined to the first cap portion via the joining portion.

4. The seal cap according to claim 3, wherein
   the cut forms a first cut,
   the joining portion includes a second cut on a side of the bolt insertion portion that corresponds to the second portion, and
   the second cut is in communication with the first cut.

5. The seal cap according to claim 1, wherein the cut is formed from an outer peripheral edge of the joining portion to the bolt insertion portion.

6. The seal cap according to claim 1, wherein a bolt protection portion, which covers an outer peripheral surface of the stud bolt, is provided at a position of the joining portion that corresponds to the bolt insertion portion.

7. The seal cap according to claim 6, wherein the bolt protection portion has a cut extending from a distal end to a base portion of the bolt protection portion on a surface that corresponds to the cap portion.

* * * * *